(12) United States Patent
Nicola et al.

(10) Patent No.: US 6,375,246 B1
(45) Date of Patent: Apr. 23, 2002

(54) FOLD AND TUMBLE SEAT SUPPORT ASSEMBLY

(75) Inventors: Kirk M. Nicola, Beverly Hills; Frank Wittman, Whitmore Lake, both of MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/700,461
(22) PCT Filed: May 13, 1999
(86) PCT No.: PCT/CA99/00506
  § 371 Date: Mar. 12, 2001
  § 102(e) Date: Mar. 12, 2001
(87) PCT Pub. No.: WO99/59836
  PCT Pub. Date: Nov. 25, 1999

Related U.S. Application Data
(60) Provisional application No. 60/085,732, filed on May 15, 1998.

(51) Int. Cl.[7] ................................................. B60N 2/10
(52) U.S. Cl. ..................................... 296/65.03; 297/326
(58) Field of Search ........................ 296/65.03; 297/325, 297/326; 248/503.1

(56) References Cited

U.S. PATENT DOCUMENTS

| | | |
|---|---|---|
| 5,238,285 A | 8/1993 | Holdampf et al. |
| 5,372,398 A | 12/1994 | Aneiros et al. |
| 5,498,051 A | 3/1996 | Sponsler et al. |
| 6,179,363 B1 * | 1/2001 | Palajac et al. ............ 296/65.03 |
| 6,227,619 B1 * | 5/2001 | Pesta et al. ............ 296/65.03 X |

FOREIGN PATENT DOCUMENTS

| | | |
|---|---|---|
| FR | 2 556 945 | 12/1984 |
| WO | WO 97/36765 | 3/1996 |

* cited by examiner

Primary Examiner—Joseph D. Pape
(74) Attorney, Agent, or Firm—Clark Hill PLC

(57) ABSTRACT

A fold and tumble seat support assembly (10) for removably securing a vehicle seat to a pair of front and rear strikers (12, 14) on the floor (16) of a vehicle. The seat support assembly includes a riser (20) having a pair of forward (32) and rearward (34) legs. A rear latch (36) is pivotally connected to each of the rearward legs (34) and operable by a first linkage mechanism (40) to latch and unlatch with the rear strikers (14). A front latch (64) is pivotally connected to each of the forward legs (32) and operable by a front latch handle (68) to latch and unlatch with the front strikers. A rear support leg (74) supports the rearward legs (34) of the riser above the vehicle floor (16). A foot bracket (56) is pivotally connected to each of the forward legs (32) for supporting the riser (20) above the vehicle floor (16) between both a generally horizontal use position and a forwardly pivoted tumbled position. A second linkage mechanism (72) is connected between the foot brackets (56) and the rear support legs (74) for automatically retracting the rear support legs (74) against the riser (20) in response to pivotal movement of the seat about the foot bracket (56) from the use position to the tumbled position. A pair of front (92) and rear (96) wheels are connected to the foot brackets (56) and rearward legs (74), respectively, for providing rolling support of the seat when removed from the vehicle in a roll-away position.

14 Claims, 4 Drawing Sheets

FOLD AND TUMBLE SEAT SUPPORT ASSEMBLY

This application is a 371 of PCT/CA99/00506 May 13, 1999 which claims benefit of Ser. No. 60/085,732 filed May 15, 1998.

FIELD OF INVENTION

The subject invention relates to a fold and tumble seat support assembly for removably securing a vehicle seat to the floor of a vehicle.

BACKGROUND OF INVENTION

Automotive vehicle rear seats often include a seat support assembly for removably supporting the seat to the floor of a vehicle. The seat support assemblies often also provide for pivoting of the seat between a use position for supporting an occupant on the seat and a forwardly pivoted position or tumbled position These seat support assemblies are often referred to as fold and tumble seat mechanisms. The seat back portion of the seat can fold onto the seat cushion and then the entire seat can tumble forward from the use position to the tumbled position These mechanisms provide an ingress/egress path for a passenger to or from behind the seat, and provide quick additional cargo room by folding tie seat back flat to the seat cushion prior to rotating or pivoting forwardly to the tumbled position.

One type of fold and tumble seat mechanism utilizes four floor strikers to attach the seat to the floor such as shown in U.S. Pat. No. 5,238,285. The seat rotates forward, when the rear latch mechanisms are released from the two rear strikers, by pivoting on the front two strikers. Once the two rear latches are released, the seat rotates forward by an applied force supplied by a spring loaded leg which is attached to the seat mechanism base or riser at one end and acts against the floor at the other end. The leg end acting against the floor contains a wheel that rolls on the floor as the seat mechanism rotates forward. The rear latch areas of the mechanism may or may not be designed to tuck into the seat mechanism as the seat tilts forward. Once the seat rotates to its full forward position, the front two latches can be released to remove the seat from the vehicle. The seat back may or may not need to be folded flat to the seat cushion prior to intended seat removal. There is minimal, if any, under-seat storage intended due to the chosen design.

Another type of fold and tumble seat mechanism utilizes six floor strikers to attach the seat to the floor. There are two strikers for each front latch mechanism and one striker for each rear latch mechanism. The seat rotates forward, when the rear latch mechanisms are released from the two rear strikers, by pivoting on the front two latch legs of the seat mechanism which are latched to the front strikers. Once the two rear latches are released the seat rotates forward by an applied force supplied by a spring load between the front latch legs and the riser. The rear latch areas of the mechanism are designed to tuck into the seat mechanism by a link connected from the front latch leg to the rear latch leg, as the seat tilts forward. Once the seat rotates to its full forward position, the front two latches can be released to remove the seat from the vehicle. The seat back may or may not need to be folded flat to the seat cushion prior to intended seat removal. Again, there is minimal, if any, under-seat storage intended due to the chosen design.

There are several inadequacies of each of the aforementioned designs. Neither design provides any under-seat storage and when the seats are removed from the vehicle and placed on the ground, the latch mechanisms support the seat weight which could damage the mechanism or the surface its resting upon.

The first type of fold and tumble mechanism uses the roller leg to supply the load to rotate the seat. This makes the reinstallation of the seat to the vehicle more difficult for the customer. Additionally, the roller can create a wear pattern on the floor. Finally, debris on the floor can interfere with the intended function of the roller leg.

The second type of fold and tumble mechanism uses six strikers to mount the seat, which is an added cost to the vehicle. Latching and unlatching the seat from the front strikers is more difficult for the passenger because the front latch mechanisms hook on one of the front strikers and latch to the other. Additionally, visibility for performing this process is poor creating some of the difficulty.

SUMMARY OF THE INVENTION

A seat support assembly for removable securing a vehicle seat to a pair of front and rear strikers on the floor of a vehicle comprises a riser having a forward leg and a rearward leg for supporting the seat above the vehicle floor. A rear latch is pivotally coupled to the rearward leg of the riser for releasably securing the seat to the rear striker. A first linkage mechanism extends between the riser and the rear latch for moving the rear latch between a latched position for engaging the rear striker and an unlatched position for disengaging from the rear striker. A foot bracket is pivotally coupled to the forward leg of the riser for supporting the seat above the vehicle floor between a generally horizontal use position with the rear latch in the latched position and a tumbled position with the riser pivoted forwardly about the foot bracket with the rear latch in the unlatched position. A rear support leg is pivotally coupled to the rearward leg of the riser and pivotal between a support position for supporting the seat above the vehicle floor and stowed position retracted against the riser A front latch is pivotally coupled to the foot bracket for releasably securing the seat to the front strikers. Finally, a second linkage mechanism is coupled between the foot bracket and the rear support leg for automatically retracting the rear support leg from the support position to the stowed position, while the first linkage mechanism automatically pivots the rear latch from an extended position for movement between said latched and unlatched positions and a retracted position folded against the riser, in response to pivotal movement of the riser about the foot bracket from the use position to the tumbled position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
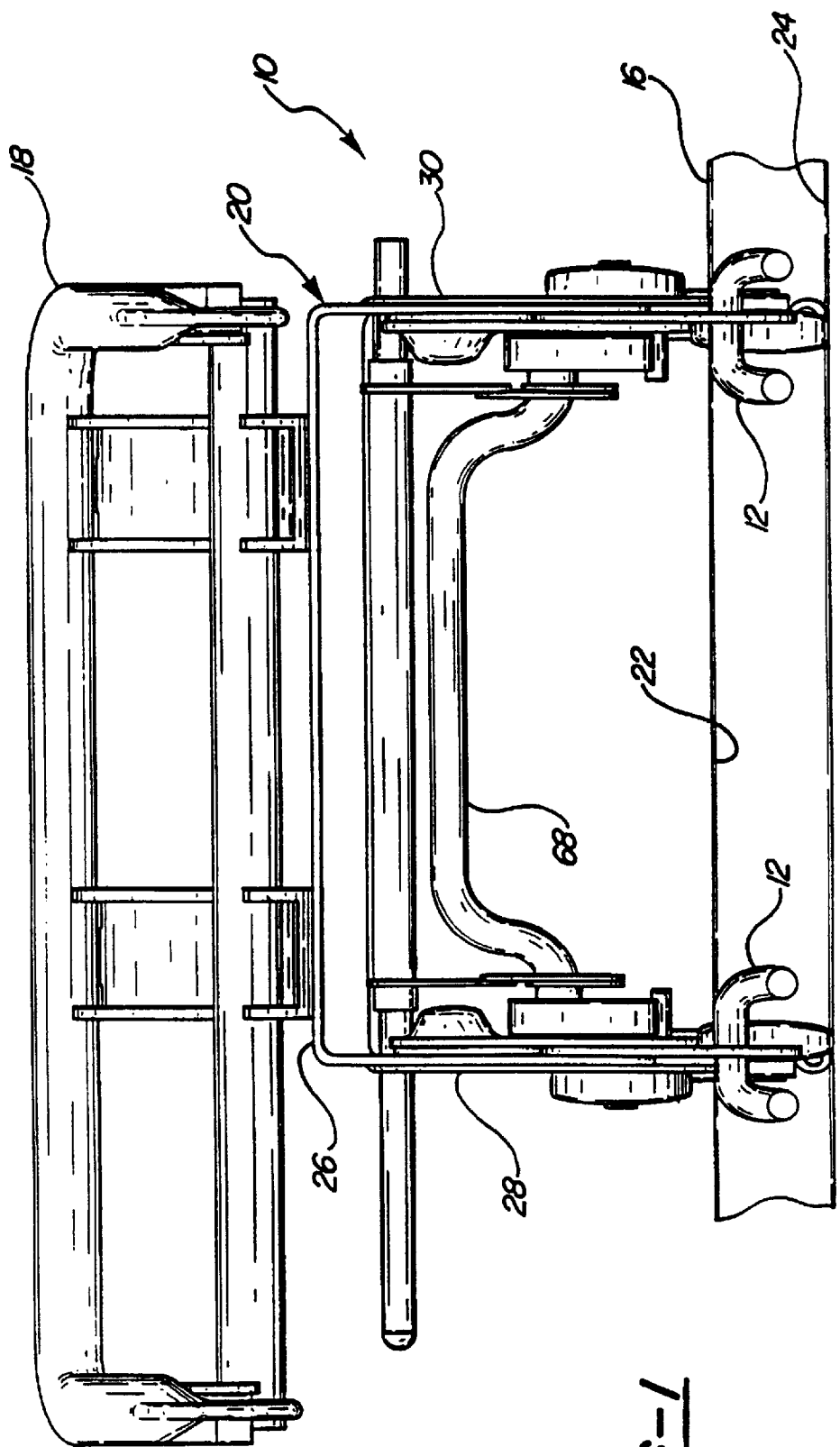
FIG. 1 is a front elevational view of the fold and tumble seat support assembly of the present invention.

Referring to FIG. 1, a fold and tumble seat support assembly of the present invention is generally shown at 10.

The seat support assembly 10 removably secures a vehicle seat to a pair of front and rear strikers 12,14 on the floor 16 of a vehicle. The seat includes a seat cushion frame 18 and a seat back mounted to the top of a riser 20 for supporting the seat above the vehicle floor 16 in a manner well known in the art. The riser 20 has a generally inverted U-shaped configuration when viewed from the front or rear of the seat support assembly 10. The riser 20 has front and rear latches, as will be discussed in greater detail herein below, which releasably connect the seat support assembly 10 to the floor 16 of the vehicle. The floor 16 has a channel 22 having a recessed sub-floor 24 in which the strikers 12,14 are mounted, The use of strikers mounted in channels is more fully described in U.S. Pat. No. 5,372,398, the entire contents of which are incorporated herein by way of reference.

Figure 2:
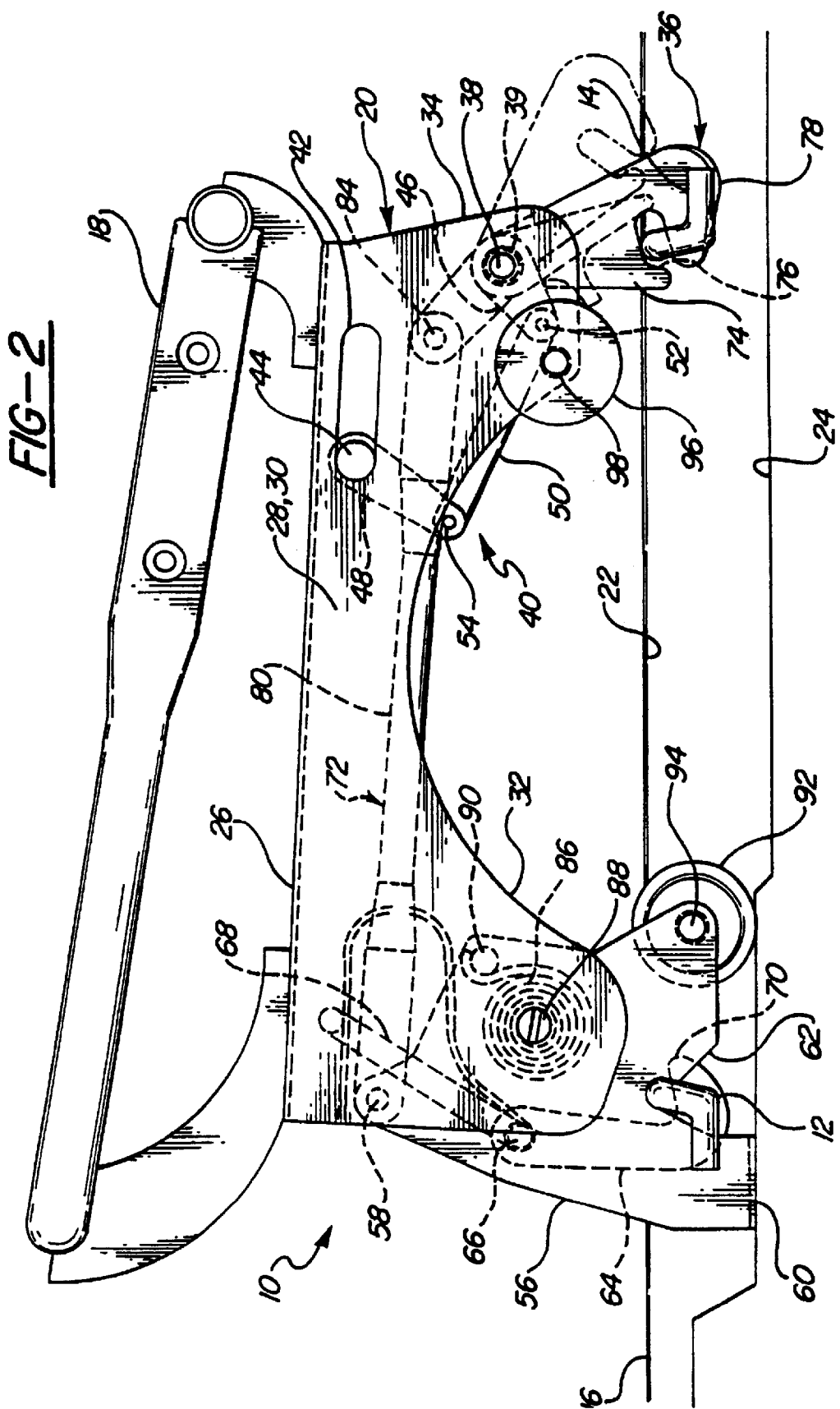
FIG. 2 is a side elevational view of the seat support assembly of FIG. 1, illustrated in a use and latched position.

The riser 20 includes an upper platform 26 for supporting the seat cushion frame 18 which extends between first 28 and second 30 sides on each side thereof which significantly space the upper platform 26 above the vehicle floor 16 providing under-seat storage. The sides 28,30 are generally the same on each side of the riser 20 and thus only one side need be described. Each side 28,30 comprises a forward leg 32 and rearward leg 34. A rear latch 36 is pivotally connected at pin 38 to the rearward leg 34 of the riser 20 for releasably securing the seat to the rear striker 14. A first linkage mechanism 40 extends between the riser 20 and the rear latch 36 for moving the rear latch 36 between a latched position for engaging the rear striker 14, as shown in FIG. 2, and an unlatched position for disengaging the rear striker 14, as shown in phantom in FIG. 2. The first linkage mechanism 40 includes a rear latch handle 42 pivotally secured by pin 44 to the side 28,30 of the riser 20 and coupled to the rear latch 36 for moving the rear latch 36 between the latched and unlatched position. The first link mechanism 40 further includes a fixed link 46 fixedly secured to the rear latch 36 for rotation therewith, a first link 48 fixedly secured to the rear latch handle 42, and a second link 50 having opposite ends pivotally connected at pins 52, 54 between the fixed link 46 and the first link 48, respectively. The links 46,48,50 transfer pivotal movement of the rear latch handle 42 to pivotal movement of the rear latch 36 during movement between the latched and unlatched positions. A coil spring 39 is secured between the pin 38 and latch 36 to continuously bias the latch 36 in the clockwise or latching direction engaging the rear striker 14.

Figure 3:
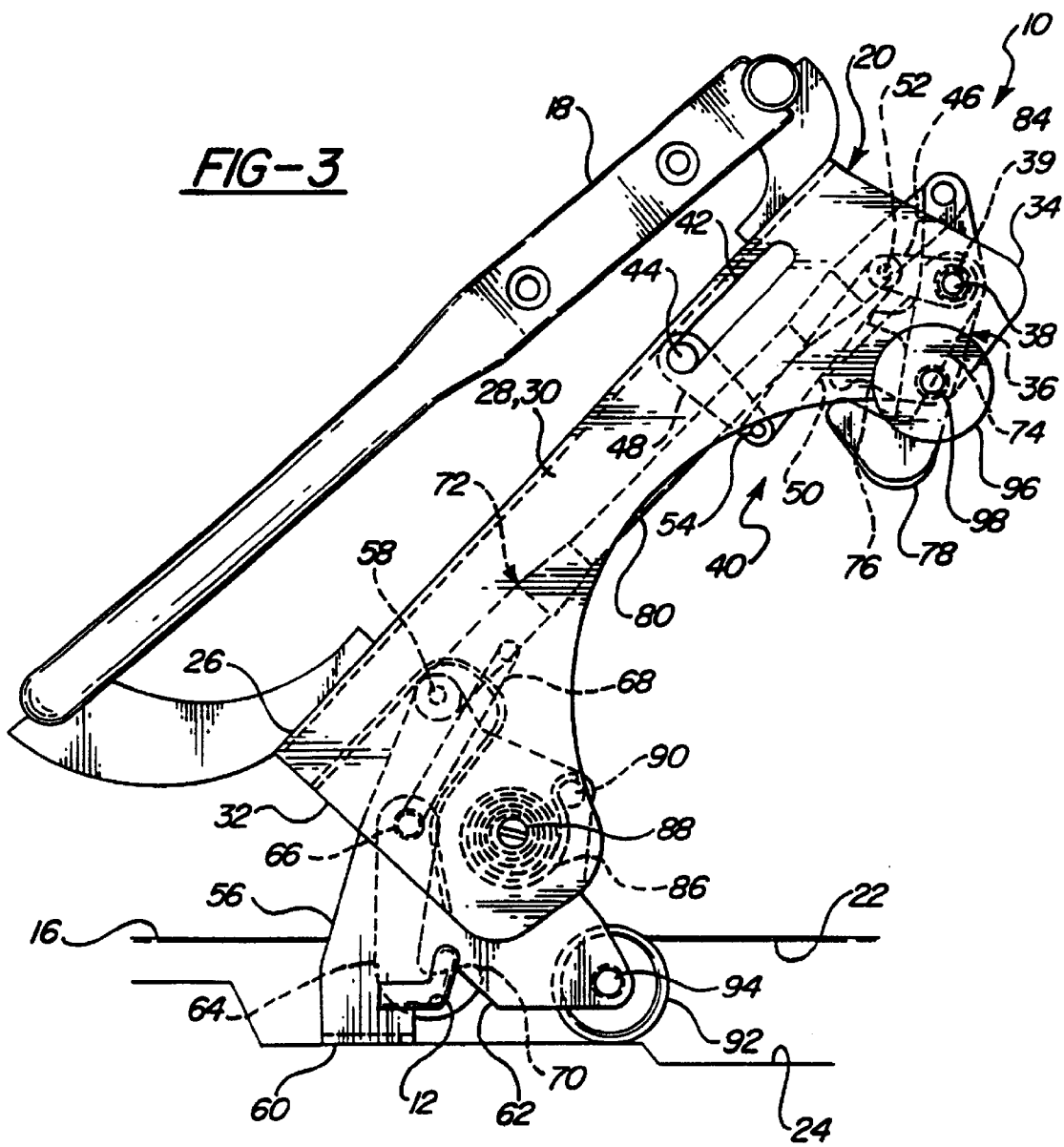
FIG. 3 is a side elevational view of the seat support assembly of FIG. 1, illustrated in a tumbled position.

A foot bracket 56 is pivotally connected at pin 88 to the forward leg 32 for supporting the seat above the vehicle floor 16 between a generally horizontal use position with the rear latch 36 in the latched position as shown in FIG. 2, and a tumbled position with the riser 20 pivoted forwardly about the foot bracket 56 with the rear latch 36 in the unlatched position, as shown in FIG. 3. The foot bracket 56 has a generally triangular configuration with the pivot at pin 88 slightly offset from the center thereof A forward lower corner of the foot bracket 56 has a pad 60 for contacting the sub-floor 24. The foot bracket 56 further includes an open notch 62 adjacent the pad 60 for receiving the front striker 12.

Figure 4:
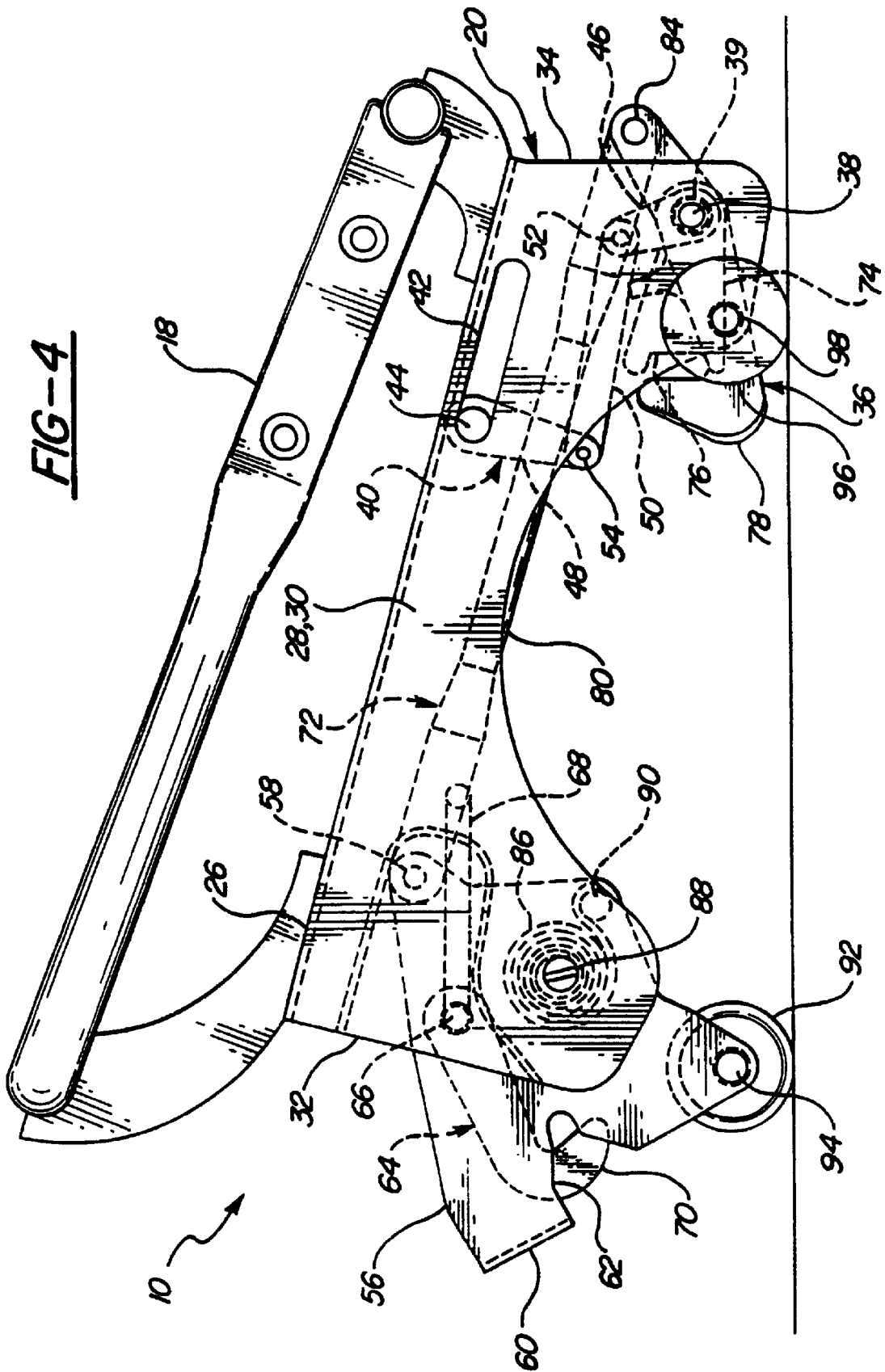
FIG. 4 is a side elevational view of the seat support assembly of FIG. 1. illustrated in a roll-away condition.

A front latch 64 is pivotally connected at pin 66 to the foot bracket 56 for releasably securing the seat to the front striker 12. A front latch handle 68 is fixedly secured to the front latch 64 for moving, or pivoting, the latch 64 between a latched position for engaging the front striker 12 when the riser 20 is in each of the use and tumbled positions, as shown in FIGS. 2 and 3, and an unlatched position for disengaging the front striker 12 and removing the seat from the vehicle floor in a roll-away position as shown in FIG. 4. The front latch handle 68 is a wire or tubular member which interconnects both the front latches 64 for ganged operation. The front latch 64 includes a J-shaped hook portion 70 for closing the open notch 62 of the foot bracket 56, capturing the front striker 12 therein and securing the riser 20 to the front striker 12 in the latched position.

A rear support leg 74 is pivotally connected to the rearward leg 34 of the riser 20 and pivotal between a support position for supporting the seat above the vehicle floor, as shown in FIG. 2, and a stowed position retracted against the riser 20, as shown in FIGS. 3 and 4. More specifically, the rear support leg 74 is pivotally connected to both the rearward leg 34 and the rear latch 36 by the pin 38 for engaging the rear striker 14 and supporting the riser 20 on the vehicle floor 16 in the use position. The rear latch 36 is continuously biased against a stop projecting outwardly form the rear support leg 74 or other portion of the rear support leg 74 by the coil spring 39. The rear support leg 74 includes on open notch 76 for receiving the rear striker 14 and supporting the riser 20 above the vehicle floor 16. The rear latch 36 includes a J-shaped hook portion 78 for closing the open notch 76, capturing the rear striker 14, and securing the riser 20 to the rear striker 14 in the latched position.

A second linkage mechanism 72 is coupled between the foot bracket 56 and the rear support leg 74 for automatically retracting the rear support leg 74 from the support position to the stowed position, while the first linkage mechanism 40 automatically pivots the rear latch 36 from an extended position for movement between the latched and unlatched positions, as shown in FIG. 2, and a retracted position folded against the riser 20, as shown in FIGS. 3 and 4, in response to pivotal movement of the riser 20 about the foot bracket 56 from the use position to the tumbled position.

The second linkage mechanism 72 includes a longitudinally extending link rod 80 having a first end pivotally connected at the pin 58 on the foot bracket 56 and a second end pivotally connected at pin 84 to the rear support leg 74 for automatically retracting the rear support leg 74 against the riser 20 in response to the pivotal movement of the riser 20 about the foot bracket 56 from the use position to the tumbled position. A spiral spring 86 is fixedly secured between the foot bracket 56 by pin 88 and the forward leg 32 of the riser 20 by pin 90 for continuously biasing the riser 20 toward the tumbled position.

A front wheel 92 is rotatably attached by axle 94 to the rearward corner of the foot bracket 56 for further supporting the riser 20 in each of the use and tumbled positions and for movably supporting the forward leg 32 when the seat is removed from the vehicle floor 16 in the roll-away position That is, in the use position and the tumbled position, both the pad 60 of the foot bracket 56 and the front wheel 92 contact the sub-floor 24 to support the riser 20.

A rear wheel 96 is rotatably attached by axle 98 to the rearward leg 34. The rear wheel 96 is spaced above the vehicle floor 16 when the rear latch 36 is in the extended position and extends below the rear latch 36 in the retracted position for movably supporting the rearward leg 34 of the riser 20 when the seat is removed from the vehicle floor 16 in the roll-away position. The rear wheel 96 is also spaced above the vehicle floor 16 when the rear support leg 74 is in the support position and extends below the leg 74 in the stowed position.

In operation, to move the seat from the use position to the tumbled position, the user simply rotates the rear latch handle 42 in the counterclockwise direction. The first linkage mechanism 40 transfers the rotational movement of the handle 42 to rotation of the rear latch 36 to release the hook portion 78 from the rear striker 14. The continuously biasing force of the spiral spring 86 will urge the seat to pivot forwardly to the tumbled position. Obviously, depending on the strength of the spring 86, some user assistance may be necessary for the seat to fully tumble. The seat will rotate about the pin 88 of the foot bracket 56. Since the foot bracket 56 is stationary and pivot 88 is offset from pivot 58, the link rod 80 of the second linkage mechanism 72 will automatically force the rear support leg 74 to retract from the support position to the stowed position. Also, the coil spring 39 of the first linkage mechanism 40 will automatically force the rear latch 36 to rotate about the pin 38 to the retracted position against the riser 20 as shown in FIG. 3. More specifically, as the rear support leg 74 is forced to rotate to the retracted position, the coil spring 39 forces the rear latch 36, which is biased against the stop 75 by the spring 39, to rotate with the leg 74 to the retracted position. The retraction of both the rear support leg 74 and the rear latch 36 optimizes ingress and egress, as well as storage, behind the seat in the tumbled position. The rear latch handle 42 maintains its orientation with respect to the riser 20 via the first linkage mechanism 40 having pivot pins 52, 54 connecting the second link 50 between the first link 48 and the fixed link 46. When the seat is rotated back from the tumbled position to the use position, the rear support leg 74 automatically returns to its extended position for support against the rear striker 14 and simultaneously forces the rear latch 36 to return to its extended position for automatic engagement with the rear striker 14. More specifically, as the link rod 80 forces the rear support leg 74 to pivot in the counterclockwise direction from the retracted position to the support position, the rear support leg 74 engages with a portion of the rear latch 36 and forces the rear latch 36 to pivot about pin 38 against the biasing force of the spring 39 from its retracted position to the extended position ready for engagement with the rear striker 14.

In the tumbled position, the seat may also be completely unlatched from the vehicle floor 16 and removed from the vehicle. In the tumbled position, the front latch handle 68 is pivoted to disengage the front latch 64 from the front striker 12. When the entire seat is removed and lowered to a generally horizontal position, the front wheels 92 support the forward legs 32 and the rear wheels 96 support the rearward legs 34 to provide rolling movement of the seat in the roll-away position. The rear support leg 74 and the rear latch 36 are retained in the stowed and retracted positions, respectively, against the riser 20 to expose the rear wheels 96 and prevent contact of the front latch 64 and Tear latch 36 with the support floor 16 of the seat to prevent damage thereto by the weight of the seat. Thus, the entire seat can be rolled away for easy removal and storage.

The invention has been described in an illustrative manner, and it is to be understood that the terminology used is intended to be in the nature of words of description rather than of limitation.

Many modification and variations of the present invention are possible in light of the above teachings. Therefore, it is to be understood that within the scope of the appended claims, the invention may be practiced otherwise than as specifically described.

What is claimed is:

1. A seat support assembly (10) for removably securing a vehicle seat to a pair of front and rear strikers (12, 14) on the floor (16) of a vehicle, said support assembly (10) comprising:

a riser (20) for supporting the seat above the vehicle floor (16), said riser (20) having a forward leg (32) and a rearward leg (34);

a rear latch (36) pivotally coupled to said rearward leg (34) of said riser (20) for releasably securing the seat to the rear striker (14);

a first linkage mechanism (40) extending between said riser (20) and said rear latch (36) for moving said rear latch (36) between a latched position for engaging the rear striker (14) and an unlatched position for disengaging from the rear striker (14);

a foot bracket (56) pivotally coupled to said forward leg (32) of said riser (20) for supporting the seat above the vehicle floor between a generally horizontal use position with said rear latch (36) in said latched position and a tumbled position with said riser (20) pivoted forwardly about said foot bracket (56) with said rear latch (36) in said unlatched position;

a rear support leg (74) pivotally coupled to said rearward leg (34) of said riser (20) and pivotal between a support position for supporting the seat above the vehicle floor (16) and stowed position retracted against said riser (20);

a front latch (64) pivotally coupled to said foot bracket (56) for releasably securing the seat to the front strikers (12);

and a second linkage mechanism (72) coupled between said foot bracket (56) and said rear support leg (74) for automatically retracting said rear support leg (74) from said support position to said stowed position, while said first linkage mechanism (40) automatically pivots said rear latch (36) from an extended position for movement between said latched and unlatched positions and a retracted position folded against said riser (20), in response to pivotal movement of said riser (20) about said foot bracket (56) from said use position to said tumbled position.

2. A seat support assembly (10) as set forth in claim 1 further including a spring (86) connected between said foot bracket (56) and said riser (20) for continuously biasing said riser (20) toward said tumbled position.

3. A seat support assembly (10) as set forth in claim 2 further including a front latch handle (68) for moving said front latch (64) between a lached position for engaging the front striker (12) when said riser (20) is in each of said use and tumbled positions and an unlatched position for disengaging the front striker (12) and removing the seat from the vehicle floor (16).

4. A seat support assembly (10) as set forth in claim 3 further including a front wheel (92) rotatably attached to said foot bracket (56) for supporting said riser (20) in said use and tumbled position and for movably supporting said forward leg (32) of said riser (20) when the seat is removed from the vehicle floor (16).

5. A seat support assembly (10) as set forth in claim 4 further including a rear wheel (96) rotatably attached to said rearward leg (34) of said riser (20) wherein said rear wheel (96) is spaced above the vehicle floor (16) when said rear latch (36) is in said extended position and extends below said rear latch (36) in said retracted position for movably supporting said rearward leg (34) of said riser (20) when the seat is removed from the vehicle floor (16).

6. A seat support assembly (10) as set forth in claim 5 wherein said rear wheel (96) is spaced above the vehicle floor when said rear support leg (74) is in said support position and extends below said rear support leg (74) in said stowed position for movably supporting said rearward leg (74) of said riser (20) when the seat is removed from the vehicle floor (16).

7. A seat support assembly (10) as set forth in claim 6 wherein said rear support leg (74) includes a first portion pivotally coupled to said rearward leg (74) of said riser (20) and said rear latch (36) and an open notch (62) for engaging the rear striker (14) and supporting said riser (20) on the vehicle floor (16) in said use position.

8. A seat support assembly (10) as set forth in claim 7 wherein said second linkage mechanism (72) includes a link rod (80) pivotally coupled between said foot bracket (56) and said rear support leg (74) for automatically retracting said rear support leg (74) and said rear latch (36) against said riser (20) and above said rear wheel (96) in response to said pivotal movement of said riser (20) about said foot bracket (56) from said use position to said tumbled position.

9. A seat support assembly (10) as set forth in claim g wherein said first linkage mechanism (40) includes a rear latch handle (42) secured to said riser (20) and coupled to said rear latch (36) for moving said rear latch (36) between said latched and unlatched positions.

10. A seat support assembly (10) as set forth in claim 9 wherein said first linkage mechanism (40) includes a fixed link (46) fixedly secured to said rear latch (36) and pivotally connected to said rearward leg (34) of said riser (20), a first link (48) fixedly secured to said rear latch handle (42), and a second link (50) having opposite ends pivotally connected between said fixed link (46) and said first link (48) for transferring pivotal movement of said rear latch handle (42) to pivotal movement of said rear latch (36) during movement between said latched and unlatched positions.

11. A seat support assembly (10) as set forth in claim 10 wherein said first linkage mechanism (40) includes a spring (39) coupled between said rearward leg (34) and said rear latch (36) for retracting said rear latch (36) from said extended position to said retracted position.

12. A seat support assembly (10) as set forth in claim 11 wherein said foot bracket (56) includes an open notch (62) for receiving he front striker (12) and said front latch (64) includes a hook (70) for closing said open notch (76) and securing said riser (20) to the front striker (12) in said latched position.

13. A seat support assembly (10) as set forth in claim 12 wherein said rear latch (36) includes a hook (70) for closing said open notch (76) on said rear support leg (74) and securing said riser (20) to the rear striker (14) in said latched position.

14. A seat support assembly (10) as set forth in claim 13 wherein said riser (20) is generally U-shaped and includes an upper platform (26) for supporting the seat and extending between first and second sides (28, 30) wherein each of said sides (28, 30) form forward and rearward legs (32, 34) of said riser (20).

* * * * *